United States Patent [19]

Piatt et al.

[11] Patent Number: 4,847,633

[45] **Date of Patent: * Jul. 11, 1989**

[54] PRINTER/FEEDER HAVING AN IMPROVED HANDLING SYSTEM FOR SHEET AND CONTINUOUS PRINT MEDIA

[75] Inventors: Michael J. Piatt, Enon; Douglas S. Maggart, Beavercreek; Timothy P. Grayson, Dayton, all of Ohio

[73] Assignee: Eastman Kodak Company, Rochester, N.Y.

[ * ] Notice: The portion of the term of this patent subsequent to Mar. 1, 2005 has been disclaimed.

[21] Appl. No.: 121,328

[22] Filed: Nov. 16, 1987

Related U.S. Application Data

[62] Division of Ser. No. 20,425, Mar. 2, 1987, Pat. No. 4,728,966.

[51] Int. Cl.$^4$ ........................ G01D 15/24; B41J 13/10; B41J 15/04

[52] U.S. Cl. .................................... 346/134; 346/136; 400/578; 400/605; 400/611

[58] Field of Search ................ 346/134, 136; 400/578, 400/605, 611, 126

[56] References Cited

U.S. PATENT DOCUMENTS

| | | | |
|---|---|---|---|
| 3,808,603 | 4/1974 | Degreve et al. | 346/134 X |
| 4,386,769 | 6/1983 | Ito et al. | 271/111 X |
| 4,521,785 | 6/1985 | Matsufuji | 346/134 X |
| 4,581,618 | 4/1986 | Watanabe et al. | 346/134 |

*Primary Examiner*—Joseph W. Hartary
*Attorney, Agent, or Firm*—John D. Husser

[57] ABSTRACT

A print media handling system for a compact printer having a housing, a cut-sheet supply station, a rotatable print platen constructed and located to feed top sheets from the supply station, through a print path ingress and out a print path egress. The sheet supply station of the print media handling system is mounted for movement to and from a sheet engaging relation with respect to the print platen. A continuous print-media inlet passage extends from a location, that is spaced from the sheet supply station, to the print path ingress and an actuator is provided synchronously enable the supply station and block the continuous media inlet passage, or vice versa. A first program control effects a predetermined start-print sequence for sheet print media, a second program control effects a predetermined start-print sequence for continuous print media; and the first or second program control is selected in response to the condition of the actuator.

7 Claims, 17 Drawing Sheets

MASTER FLOW CHART

TRACTOR START UP

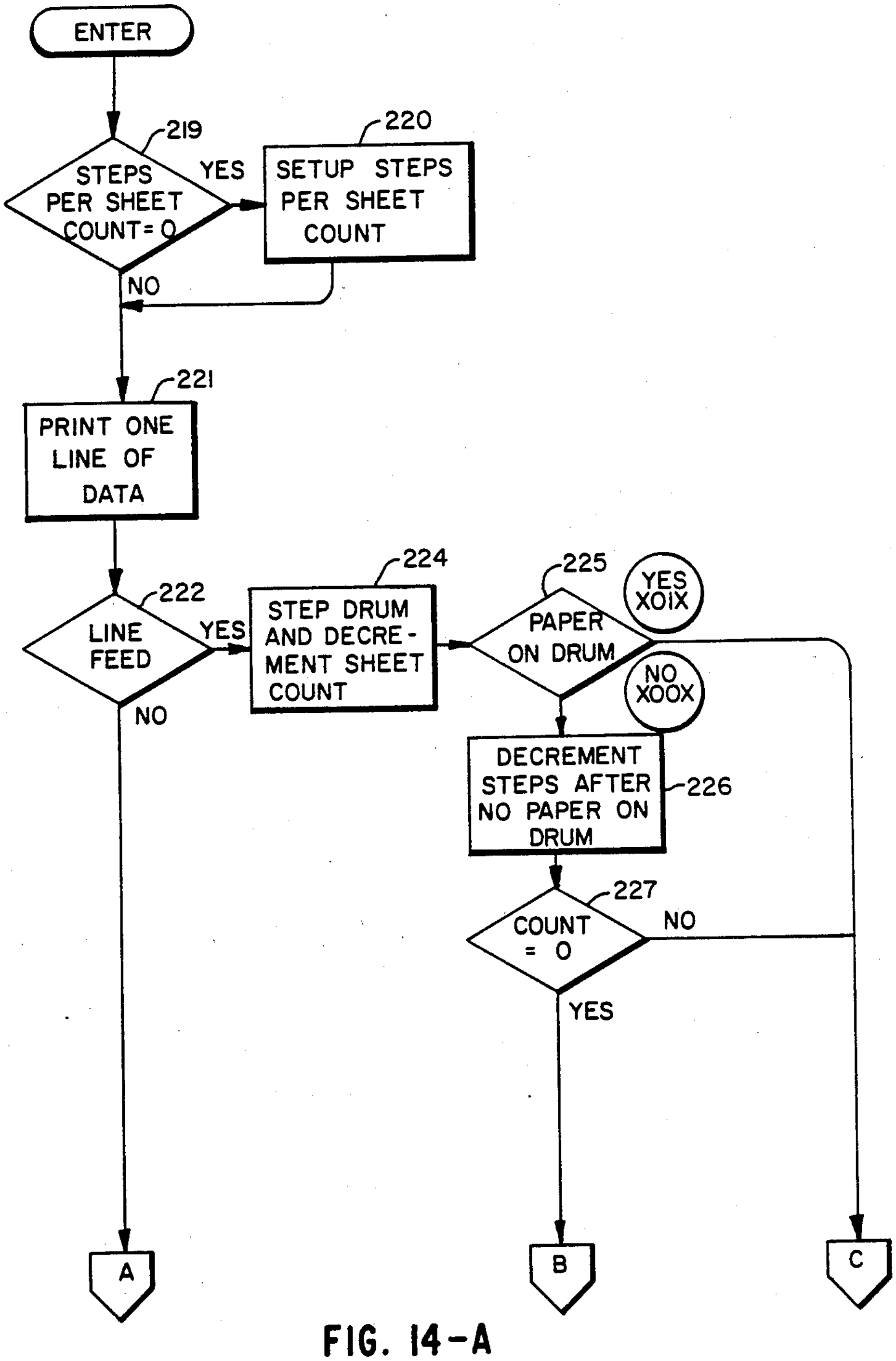
FIG. 14-A
TRACTOR PRINTING

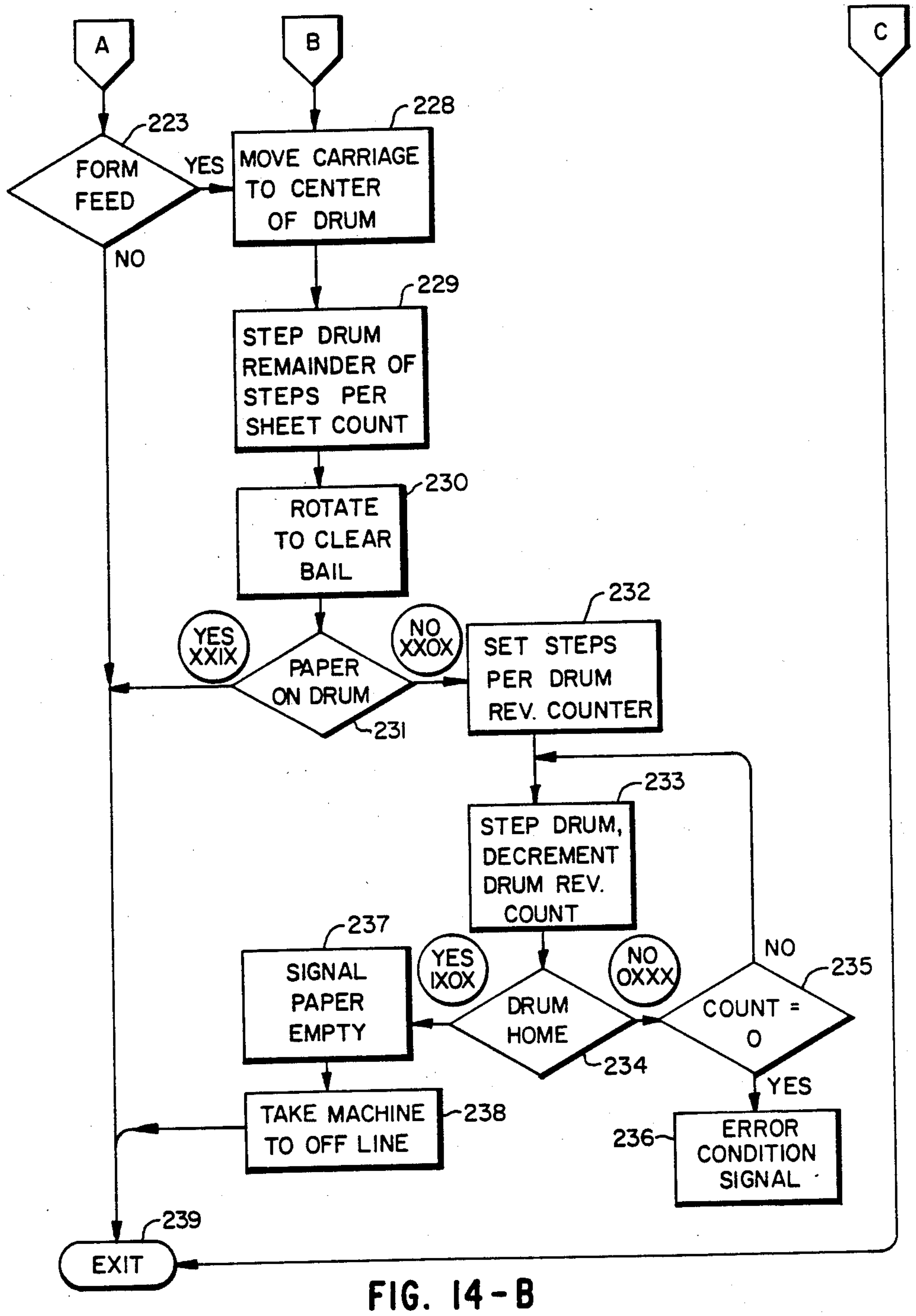
FIG. 14-B
TRACTOR PRINTING (CONT.)

SHEET FEED STARTUP

FIG. 16-A
SHEET PRINTING
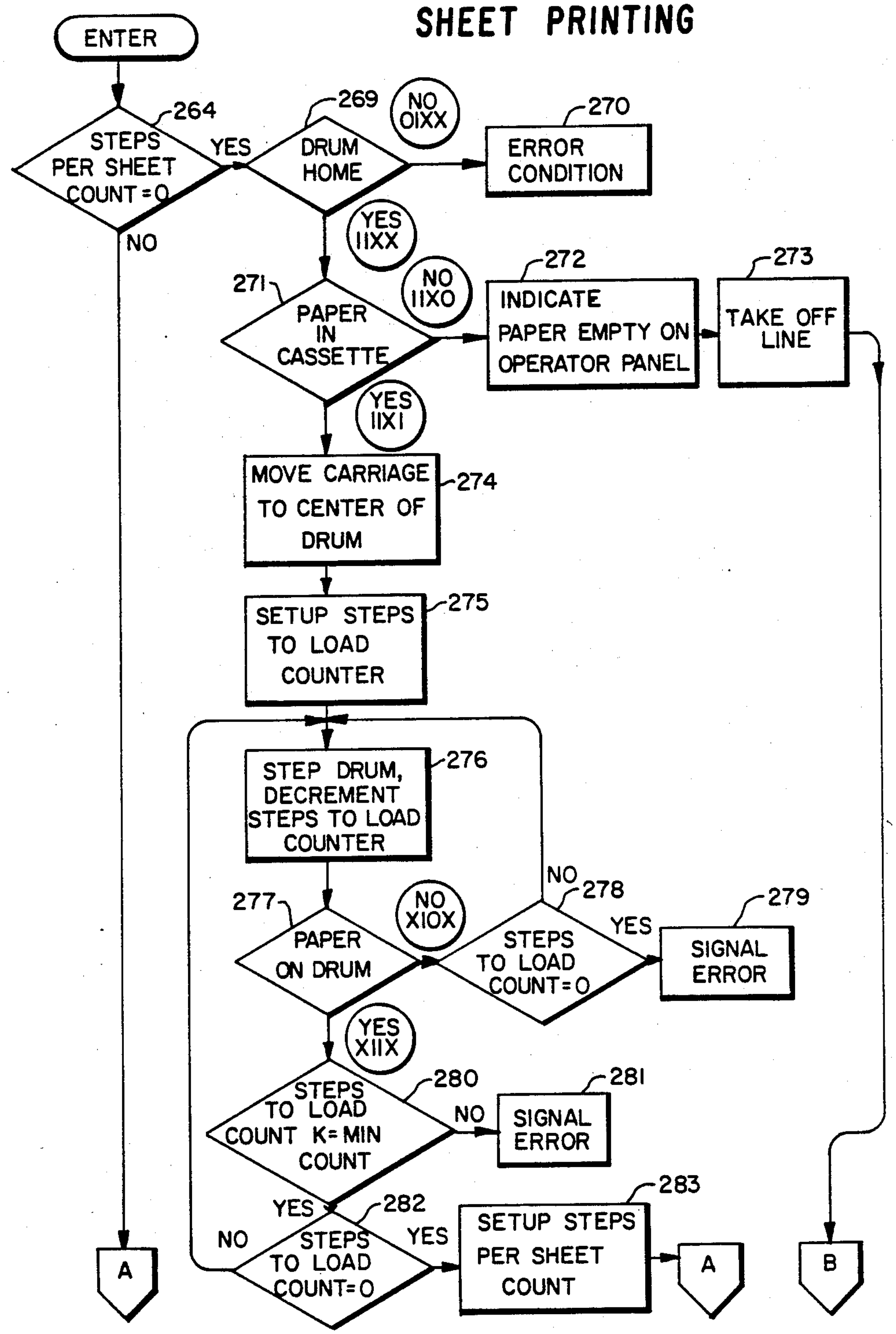

FIG. 16-B
SHEET PRINTING (CONT.)
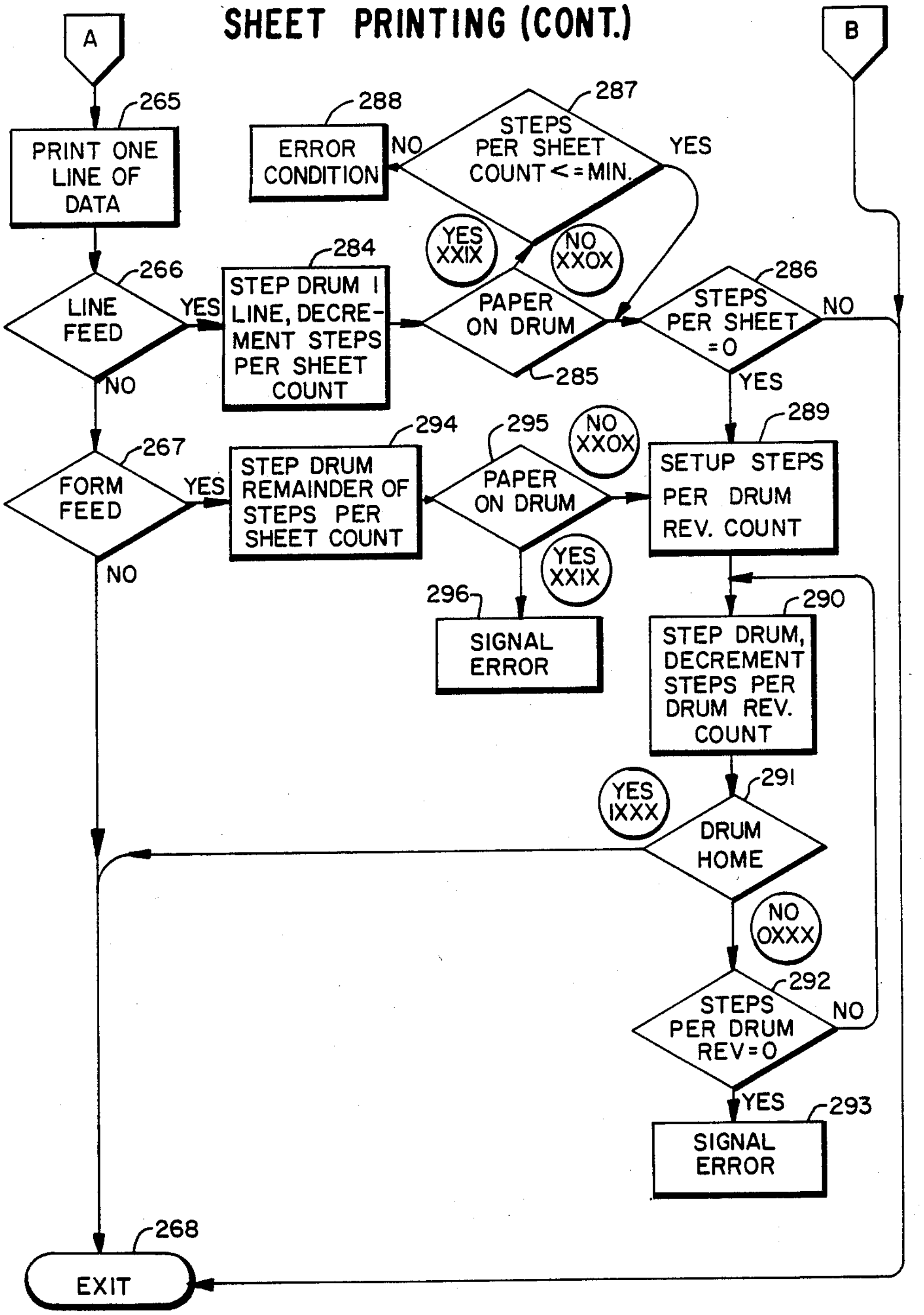

PRINTER/FEEDER HAVING AN IMPROVED HANDLING SYSTEM FOR SHEET AND CONTINUOUS PRINT MEDIA

This is a division of application Ser. No. 20,425, filed Mar. 2, 1987 now U.S. Pat. No. 4,728,966.

BACKGROUND OF THE INVENTION

1. Field of the Invention

The present invention relates to printing apparatus having an integral sheet feeder and more particularly to integral control systems of such printer/feeder.

2. Background Art

U.S. Pat. No. 4,763,138 discloses a highly useful structural approach for providing a "built-in" sheet feeding capability for serial output printers, e.g. of the traversing head type. These constructions enhance printer compactness by employing unique platen and sheet guide cooperations that enable both sheet feed and transport via the platen drive. In one embodiment described in that application, selective engagements, at a supply station contact zone, between a rotary platen and the top sheet of the supply stack effect feed of the sheet to a bail roller nip region that is located along the printing path. After the lead edge of a print sheet is within such nip, the feeding engagement at the supply stack region can terminate, until a next sheet feed is desired.

SUMMARY OF INVENTION

One important purpose of the present invention is to provide an improved media handling system which cooperates with the sheet feed constructions of the above-cited patent to enable alternate handling of sheet or continuous print media.

Thus, in one aspect, the present invention provides an improved media handling system for a compact printer having a housing, a cut-sheet supply station formed in a first portion of the housing and a rotatable print platen constructed and located to feed top sheets from the supply station, through a print path ingress and past a print zone and a print path egress formed in a second portion of the housing. The print media handling system includes menas mounting the supply station for movement to and from a sheet engaging relation with respect to the print platen; means forming an inlet passage from a location spaced from the supply station to the print path ingress, actuator means for synchronously effecting the movement of the supply station and the blocking of the inlet passage, first program control means for effecting a predetermined start-print sequence for sheet print media, second program control means for effecting a predetermined start-print sequence for continuous print media, and means for detecting the condition of said actuator means and selecting said first or second program control means in response thereto.

BRIEF DESCRIPTION OF THE DRAWINGS

The subsequent description of preferred embodiments of the invention refers to the attached drawings wherein:

FIGS. 12–16 are flow charts indicating detection and control functions performed by the printer/feeder in accord with the present invention.

DETAILED DESCRIPTION OF PREFERRED EMBODIMENTS

Figure 1:
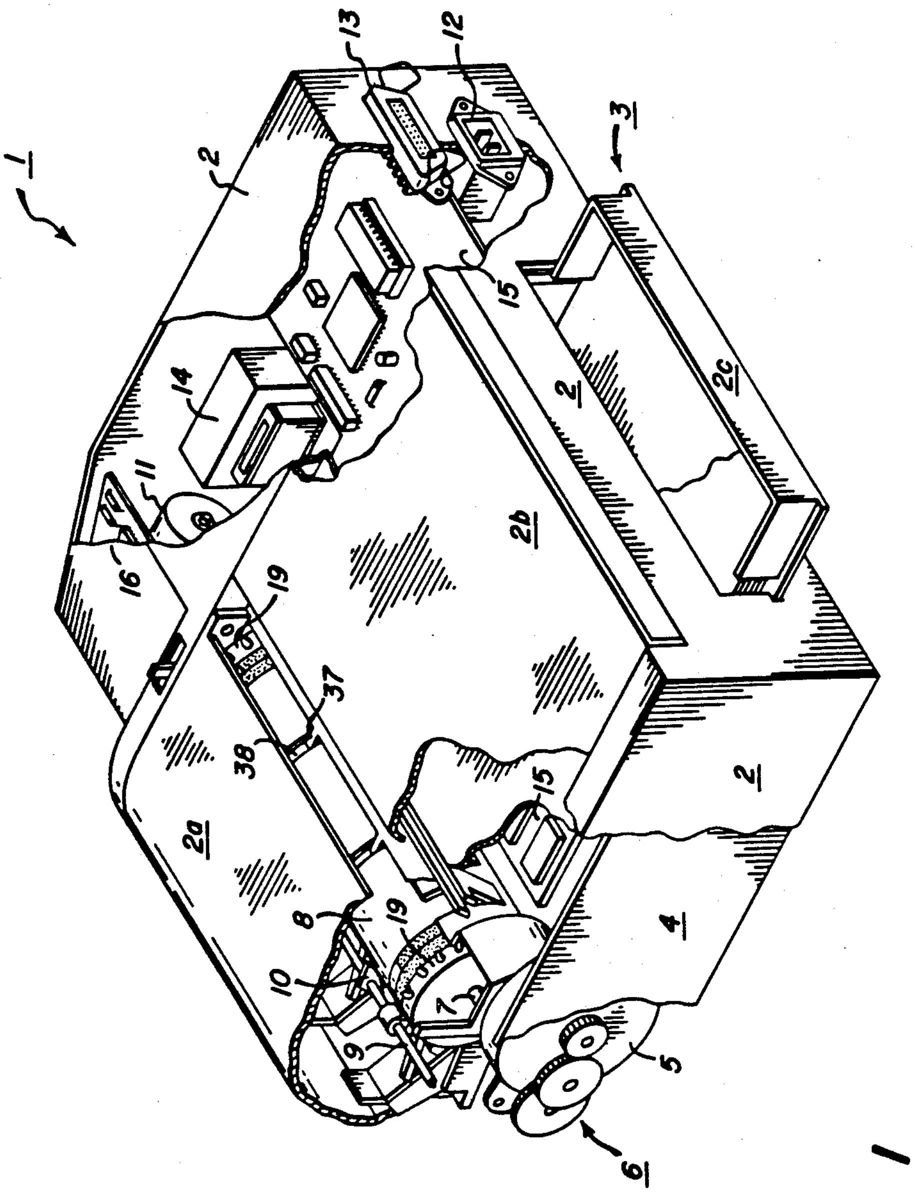
FIG. 1 is a perspective view, with portions broken away, showing one printer embodiment with which the present invention is useful.

The printer 1 shown in FIG. 1 is an embodiment of the present invention employing ink jet printing with insertable, drop-on-demand print/cartridges. While this printing technology is particularly useful for effecting the objects of the present invention, one skilled in the art will appreciate that many of the subsequently described inventive aspects will be useful in compact printers employing other printing approaches. The printer 1 has a housing 2, which encloses the operative printer mechanisms and electronics, and includes a pivotal front lid 2*a*, a pivotal rear lid 2*b* and a rear wall 2*c* of cassette drawer 3. Within the housing 2 is a main frame assembly (one wall 4 shown in FIG. 1) on which various components of the printer are mounted. Thus, a platen drive motor 5 is mounted to impart rotary drive through gear train 6 to a drive shaft 7 for a cylindrical platen 8 constructed in accord with one preferred embodiment of the invention, subsequently explained in more detail. Also mounted on the main frame assembly is a bail assembly 9 which is constructed to cooperate with platen 8 in accord with the present invention, as well as to support a print/cartridge carriage 10, which is shown in more detail in FIG. 2. Also shown in FIG. 1 are the printer's carriage drive motor 11, power and data input terminals 12, 13, power transformer means 14 and logic and control circuitry, which is disposed on one or more circuit boards 15. A control panel 16 for operator interface is disposed on the top front of the print housing.

Figure 2:
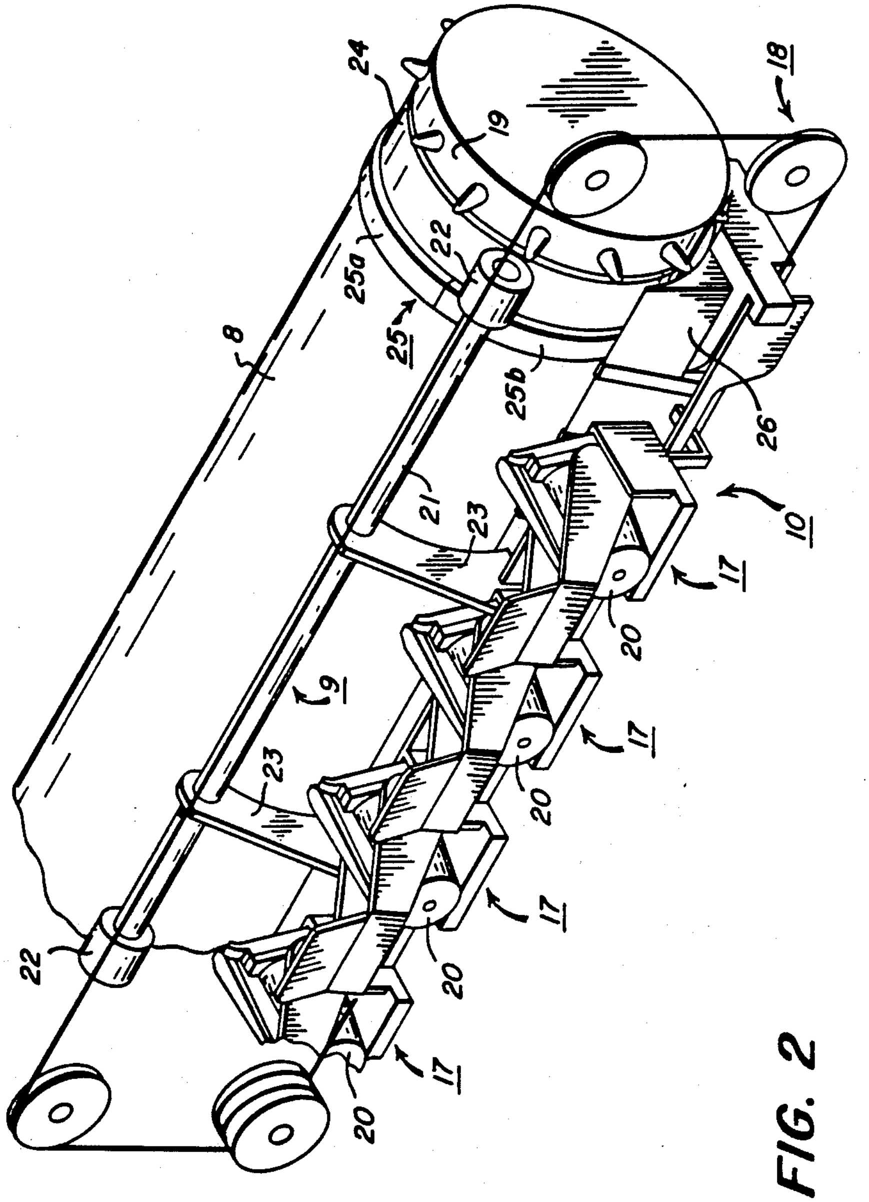
FIG. 2 is a perspective view, compressed in the axial dimension and having other portions exaggerated in scale to illustrate details of the print platen and print head carriage assembly of the FIG. 1 printer.

Referring to FIG. 2, the print/cartridge carriage 10 can be seen to comprise four nests 17 coupled for movement as a unit to translate across respective line segments of a print zone. Each of nests 17 is adapted to insertably receive, position and electrically couple a print/cartridge 20 in an operative condition within the printer. Such print/cartridges can be thermal drop-on-demand units that comprise an ink supply, a driver plate and an orifice array from which ink drops are selectively ejected toward the print zone in accord with data signals, e.g. transmitted through the printer logic from a data terminal such as a word processor unit. Both the print/cartridge construction and the positioning and coupling structures of nests 17 are described in more detail in U.S. Pat. No. 4,763,138 now U.S. Pat. No. 4,736,213 which is incorporated herein by reference. However, other serial printing structures can be usefully employed in combination with the present invention. FIG. 2 also illustrates a carriage drive assembly 18, comprising a cable and pulley loop coupled to the motor 11 and to the carriage 10. Tractor feed wheels 19 mounted on the ends of platen 11 are used to advance tractor feed medium when printer 1 operates in that alternative printing mode.

Considering now the sheet feed constructions in accord with the present invention, the perspective illustration in FIG. 2 shows cooperative platen and carriage structures with non-scale sizes for more clear visualization of significant features. Specifically, platen and carriage assembly features have been axially compressed and the platen end features enlarged to show one preferred embodiment that enables platen rotation to effect the feeding of sheets from a supply stack, as well as transport of a fed sheet along the print path, from an ingress through the print zone and through a printer egress. Thus, the bail assembly 9 includes a shaft 21 which rotatably supports bail pressure rollers 22 near each end of the platen and which slidingly supports guide arms 23. As shown, the guide arms curve around the front platen periphery down into the zone of their attachment with other portions of carriage assembly 10. Axially inwardly from the tractor feed wheels at each end of the platen, there are constructed frictional transport bands 24, e.g. formed of a rubberized coating. Each of bands 24 extends around the entire platen periphery and is of substantially the same diameter as the platen 8. The frictional transport bands are respectively aligned with pressure rollers 22 so as to pinch paper therebetween in a manner that causes transmission of the platen rotation to a print sheet which has passed into their nip. Axially inwardly from each of transport bands 24 the platen comprises raised feed ring portions 25 that extend around the platen periphery. The feed ring portions extend above the platen surface, e.g. about 0.015", and each is divided into a rough surface sector 25*a* and a smooth surface sector 25*b*. The rough sectors of the two feed rings are at corresponding peripheral locations, as are their smooth sectors.

Also shown in FIG. 2 is a lower sheet guide member 26 which extends along the lower periphery of platen 8 from an ingress of the sheet feed path to a location contiguous the lower extensions of guide arms 23. Thus, portions 26 and 23 define means for guiding a fed sheet in close proximity to the platen 8, from the print path ingress into the nip of pressure roller 23.

Figure 4A:
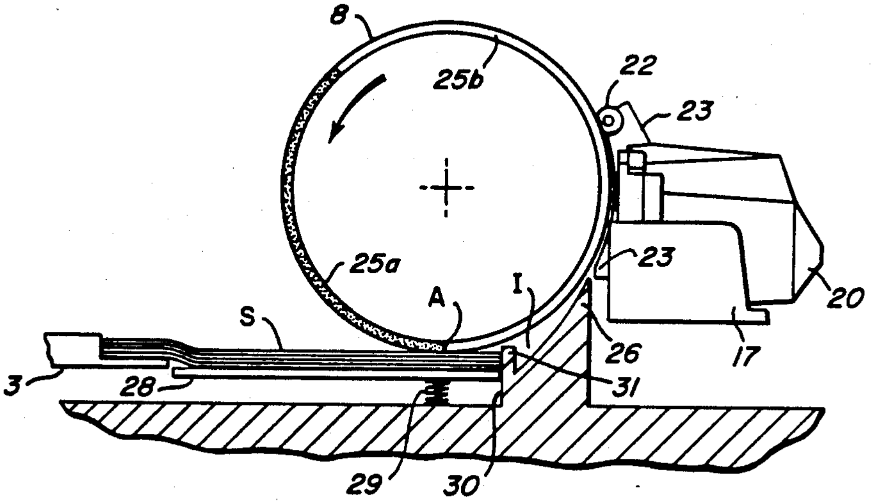
FIGS. 4-A through 4-C are a side view showing details of the sheet feed/transport platen of the FIG. 1 printer and its relation with the sheet supply station.
Figure 4B:
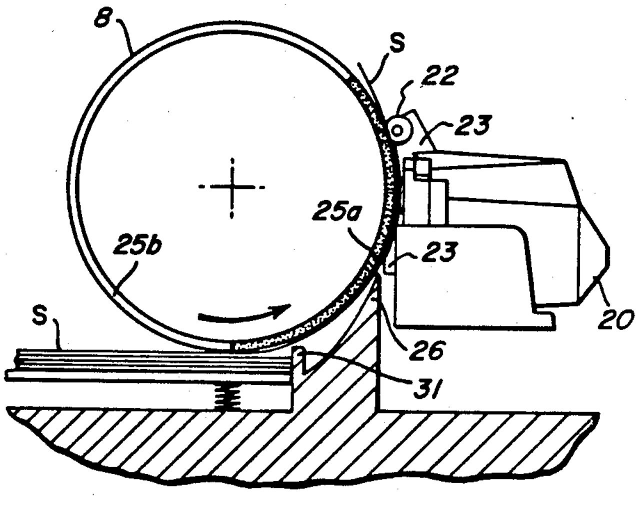
Figure 4C:
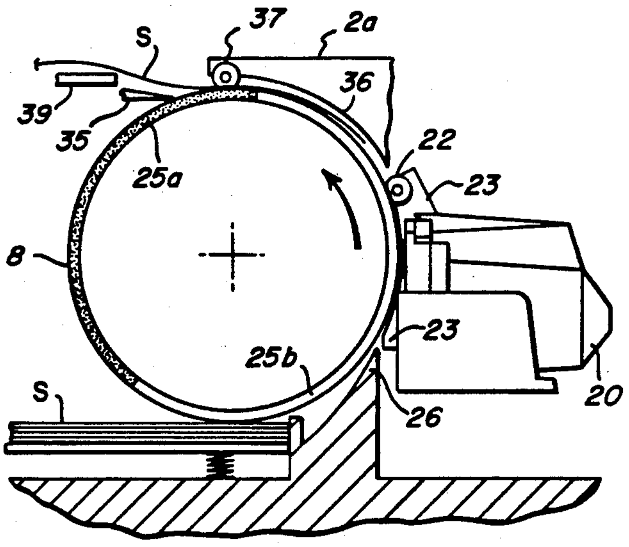

Referring back to FIG. 1, it can be seen that the cassette drawer 3 is slidably mounted in the bottom of the printer for movement between a withdrawn location (for the insertion of a stack of print sheets) and a stack positioning location. As shown in FIG. 4-A, the front end of the stack S positioned by cassette 3 rests on a force plate 28 which is pivotally mounted at its rear end for up-down movement and is biased upwardly by spring means 29. The leading stack edge is indexed against sheet index plate 30 and buckler members 31 (shown in more detail in FIG. 6). The functions of the structural elements described above will be further understood by considering the sheet feeding and printing sequences of the printer 1 with reference to FIGS. 4-A through 4-C. At the stage shown in FIG. 4-A, the platen 8 has been initialized to a start position. In this condition the leading edges of the rough surface sectors 25*a* of feed rings 25 are located at the contact point A with the top face sheet of a stack positioned by cassette 3. It is preferred that the contact zone A be located slightly rearwardly from the front edges of the stack, as shown in FIG. 4-A, to facilitate buckling separation of the top sheet when sheet feed commences.

As the platen 8 rotates counterclockwise between the FIG. 4-A and FIG. 4-B conditions, the rough surface portions 25*a* force the top stack sheet into contact with, and over, buckler elements 31, into the print path ingress I. The sequential engagements at contact zone A between successive rough surface portions 25*a* and successive portions of the upwardly biased top sheet S drive the leading sheet edge along the print path defined by the guide means 26, 23 so that the leading edge of the sheet will move into the nip between pressure rollers 22 and transport bands 24. After the leading sheet edge has passed into the nip, the feed by rough surface portions 25*a* is no longer required and, as illustrated in FIG. 4-C, the smooth portions 25*b* can now exist at the contact zone. Feed of the print sheet continues to be provided by the rotation of the platen, now by virtue of the drive transmission at the nip of roller 22, as successive lines of information are printed by traversing print/cartridges 20.

In the system illustrated in FIGS. 4-A through 4-C, the drum makes two revolutions per sheet and, as shown in FIG. 4-C, toward the end of the second revolution, the trailing edge of a printed sheet S is egressing the nip of roller 22 and smooth portions 25*b* are still passing through the contact zone. Thus, the next successive top sheet is not yet fed from the stack. When the rotation of platen 8 progresses back to the stage shown in FIG. 4-A (completing its second revolution), the trailing end of the fed sheet has passed pressure roller 22 and the next sheet feeding and transport sequence is initiated.

Figure 5:
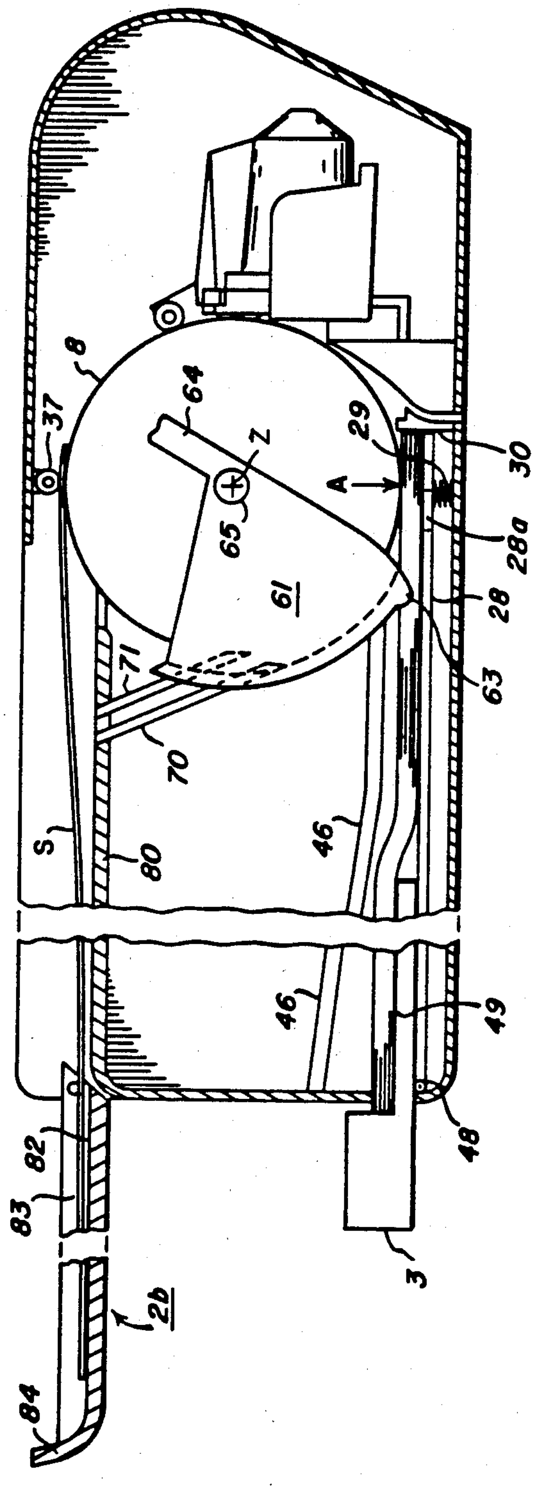
FIG. 5 is a schematic cross-sectional view of the FIG. 1 printer showing further details of the print supply and output stations.

As shown in FIG. 4-C, it is desirable for the housing top to embody guide structure 36 and additional pressure rollers 37, aligned with bands 24 so that a printed sheet is moved completely onto the output tray 39, revealed by opening lid 2*b*. This structure is pivotal away from the drum with front lid 2*a* to allow removal of a printed sheet if a job ceases at the FIG. 5 stage. As shown in FIG. 1 and FIG. 5, stripper fingers 37 are disposed within recesses 38 of platen 8 to assist in directing a sheet into the output tray when a series of sheets are printed successively. Further details of the feeder/transport system described above are set forth in the aforecited U.S. Pat. No. 4,763,138, which is incorporated herein by reference for those teachings. For example, this application describes how various other embodiments having different diameter drums and thus different revolutions per sheet feed can be constructed. It will be appreciated that such construction provides a compact and mechanically simple system for feeding and transporting sheets in the printer and the present invention can be applied to the variety of printer/feeder constructions described therein.

Figure 3:
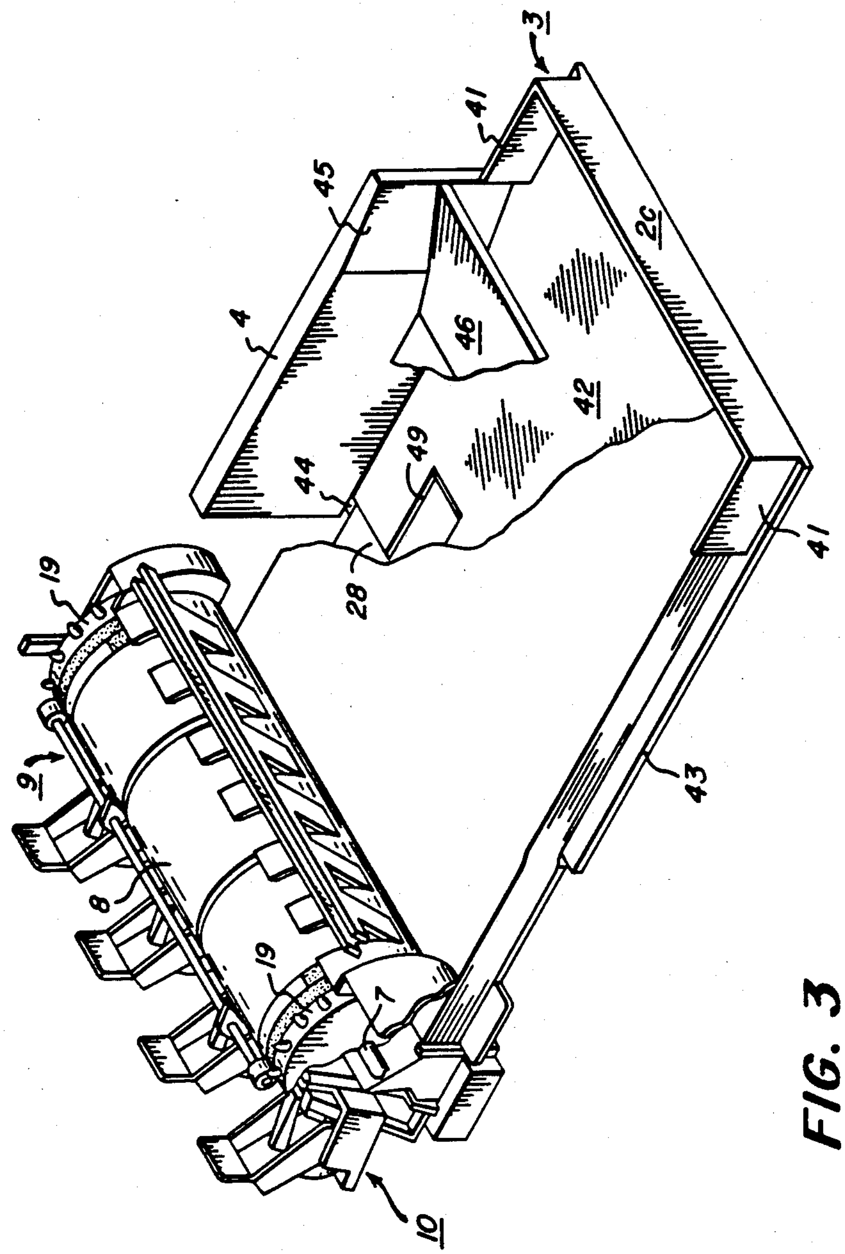
FIG. 3 is a perspective view of FIG. 1 printer portions, with housing removed.

Referring now to FIGS. 3 and 5, the structural and functional details of the sheet supply station will be described. Thus, cassette drawer 3 includes drawer face 2*c*, partial side walls 41 and bottom wall 42 which are constructed to receive and support the rear sector of a sheet stack for use in the printer. The drawer 3 is supported for sliding movement in the lower rear of the printer housing by the interfitting of the side flanges 43 in grooves 44 of the main frame 4 of the printer. The drawer 3 is movable between three functional positions, viz.: (i) a storage or carrying position wherein face 2c is flush with rear wall 2 of the printer, (ii) a stack inserting position, more fully withdrawn than shown in FIGS. 1 and 3 and (iii) a stack indexing position as shown in FIGS. 1, 3 and 5.

Figure 6:
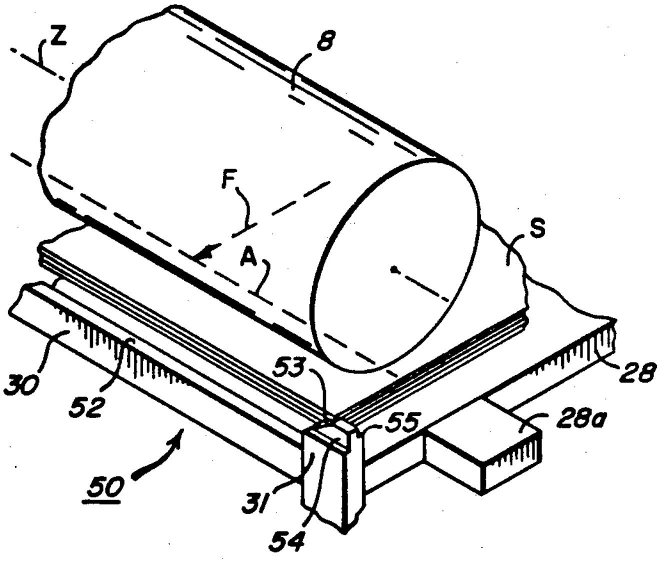
FIG. 6 is a schematic perspective view of an interior portion of the FIG. 1 printer device showing portions of the feed/transport platen and sheet supply station.

Referring to FIG. 3, the rear portions of the two side walls (one not shown) of main frame 4 have formed thereon slanted end surfaces 45 which constitute side guides for centering an inserted sheet stack with respect to the feed and transport paths of the printer 1. Above the interior path of cassette drawer 3 is a top guide wall 46 having a downwardly slanted first portion adapted to direct sheet stacks downwardly onto the force plate 28 as they move into their indexed position. As best shown in FIGS. 5 and 6, an index plate 30 is located along the path of an inserted sheet stack, forwardly within the printer of the contact zone A (between the face sheet of an inserted stack and platen 8).

It is preferred that force plate 28 move toward the contact zone A so as to be generally tangential to the periphery of platen 8 at the line of contact between top stack sheets and platen 8. For that purpose the force plate 28 is coupled to the main frame 4 at the rear of the printer by hinge 48. To avoid contact between the upward movement of force plate 28 and the bottom wall 42 of cassette drawer 3, the forward portions of wall 42 have comb-like notches 49 and the rearward portions of the force plate have interfitting notches (not shown).

Considering now the operation of sheet stack insertion, the cassette drawer is first withdrawn to its fully extended position and the front end of a stack (e.g. about 150 sheets of $8\frac{1}{2}'' \times 11''$ paper) is inserted into the opening formed by side guides 41 and top guide 46. When the stack has been sufficiently inserted so that its trailing end will rest on bottom wall 42 inside drawer face 2c, the cassette drawer 3 is moved to the stack indexing position shown in FIGS. 1, 3 and 5. Thus, drawer wall 2c will move the front end of sheet stack S beneath the platen 8 and into abutment with index wall 30. At this stage spring 29 will be urging the top and successive stack sheets into engagement with the periphery of platen 8.

Referring to FIG. 6, there is shown a portion of a preferred sheet separator construction which is especially suited for use in cooperation with the sheet feed system described above. Thus, the sheet feeding and buckler device 50 comprises stack index plate 30 having a plate 51 precisely parallel to axis Z of platen and two opposing sheet buckler posts 31 located to form a channel through which the top stack sheet can pass when its leading edges buckle inwardly. The specific details of this sheet separator system are described in concurrently filed U.S. Pat. No. 4,783,669, which is incorporated herein by reference for those teachings. When the force plate 28 is in the upward, sheet feed position shown in FIGS. 5 and 6, rotation of the platen effects sequential sheet feed from stack S as described with respect to FIGS. 4-A to 4-C.

The printer 1 has a print-media selection construction which allows an operator to switch between the sheet printing mode described above and a continuous print media mode, e.g. with continuous, tractor-feed media. As will be understood from the subsequent description, this print mode selection construction provides the advantage that it is not necessary to remove sheet media from the printer cassette-drawer in order to operate with continuous print media. Also, the construction is advantageous in that the operator is inhibited from inserting continuous web media when the printer is in the sheet feed selection mode.

Figure 7:
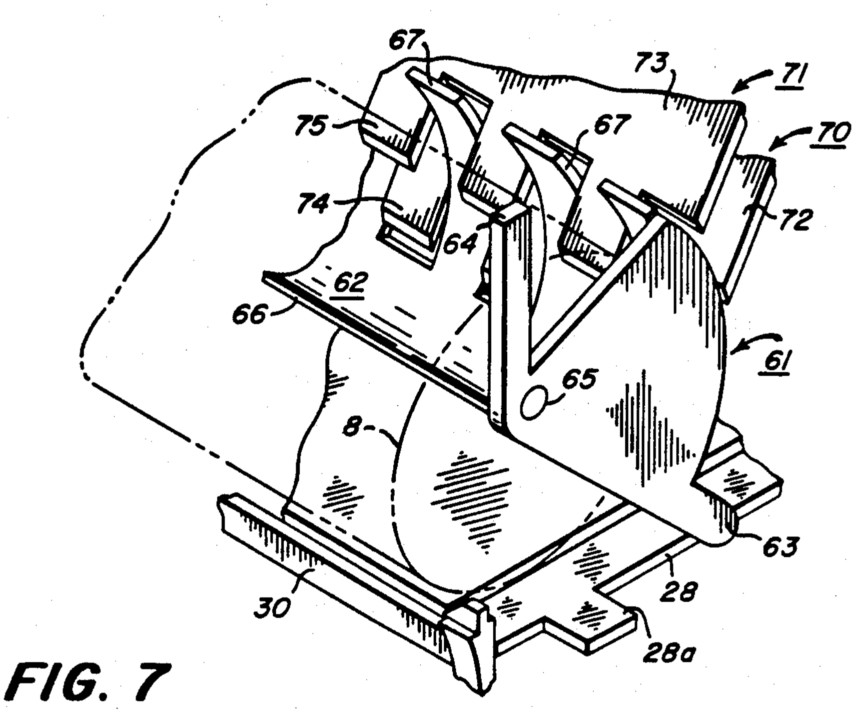
FIGS. 7 and 8 are perspective views showing operational mode selection structures of the FIG. 1 printer respectively in sheet feed and continuous feed orientations.
Figure 8:
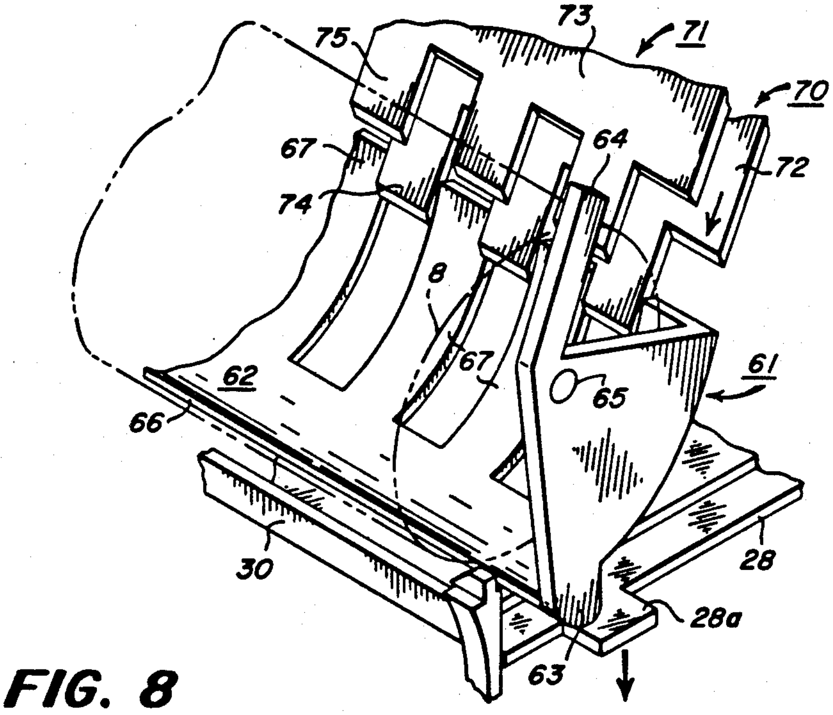
Figure 9:
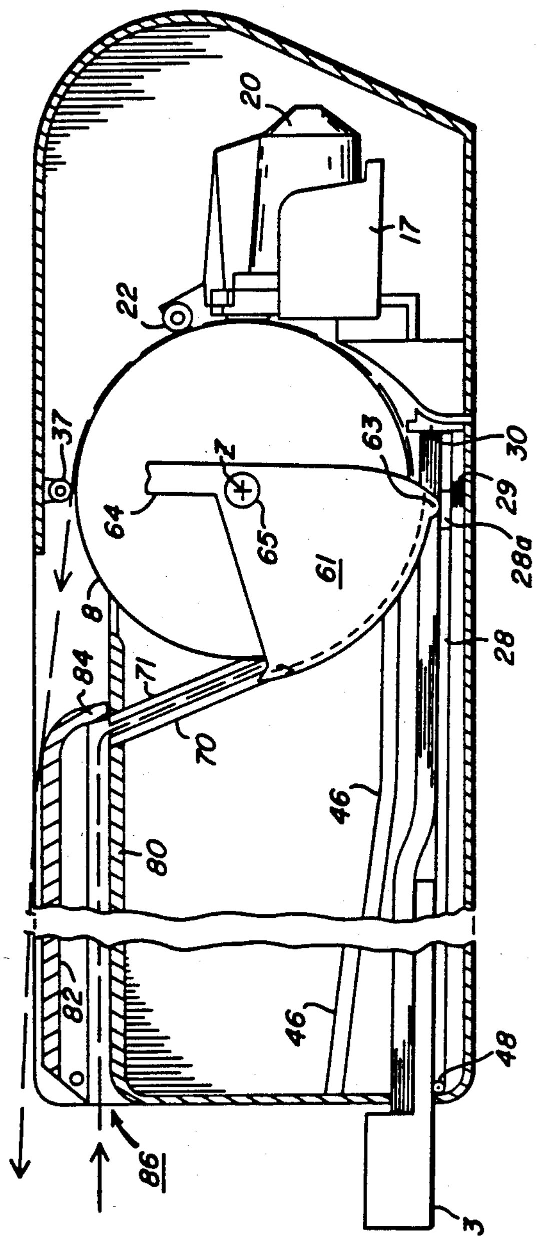
FIG. 9 is a side view like FIG. 5, but with the printer selection structure in continuous feed orientation.

The details of one preferred embodiment of mode selection construction can be seen most clearly by referring to FIGS. 5 and 7–9. Thus, FIGS. 5 and 7 show the mode selection construction in the sheet media orientation and FIGS. 8 and 9 show that construction in the continuous media orientation. More particularly it can be seen that the printer 1 includes a selection lever 60 that has end portions 61 adjacent each end of platen 8 and a central portion 62 that extends around the rear portion of the platen rotation path. The end portions 61 (only one shown) each include a cam portion 63, an actuating lever portion 64 and a journal portion 65 which mounts the lever 60 for rotation about the axis Z of platen 8. As best seen in FIGS. 7 and 8, the central portion 62 has a comb-like profile with a guide lip 66 and guide teeth 67. FIGS. 7 and 8 also show how the central portion 62 of lever 60 cooperates with a pair of continuous media input guide plates 70 and 71. Thus guide plates 70, 71 also have a comb-like profile with inlet lip portions 72, 73 and teeth portions 74, 75 that are sized and located to interfit with teeth portions 63 of lever 60.

The purposes of the constructions just described will be understood by considering their functions in each of the print media selection orientations. Thus, when the actuator arm 64 of mode selector lever 60 is moved toward the front of the printer to its sheet media position as shown in FIGS. 5 and 7, two operational conditions are effected. First, the cam portions 63 of lever 60 are moved out of contact with tab portions 28a of force plate 28. This allows spring 29 to move the force plate upwardly so that the sheet stack S supported thereon is moved to contact the feed/transport platen 8. This enables the sequential feeding of top sheets from the stack as already described. Second, the forward movement of the actuator arm 64 moves the teeth portions 67 of the central lever portion into a position that blocks the passage for continuous web ingress, i.e. between inlet guide plates 70, 71 as shown in FIG. 7. This prevents inadvertent jamming that would be incident to an operator feeding continuous print media into the printer when the sheet feed system is in an operative condition.

Now consider the function of these mode selector constructions when the actuator arm is moved rearward into continuous mode condition shown in FIGS. 8 and 9. In this condition cam portion 63 of lever 60 has, via tab 28a, moved force plate 28 to its lower condition so that its supported stack does not engage platen 8. Moreover, the stack is lowered to an extent that opens a continuous web inlet path over the top of the now-lowered sheet stack. In addition the guide lip portion 62 of lever 60 is moved to a location proximate the print path ingress, so that a continuous web introduced between guide plates 70, 71 is now guided around the lower rear of the platen by the central lever portion and over the index plate 30. Note, the teeth portions 67 no longer block the continuous web inlet path, but now form an extension of the inlet guide from teeth 74 around the lower rear of the platen 8. Thus it will be appreciated that a continuous web print media can be fed into its operative path, engage with tractor-feed portions 19 of platen 8 and continuous media printing can progress, all without removal of the sheet stack S from the printer. FIG. 9 shows one preferred embodiment of the continuous print media egress path which is described in more detail in U.S. Pat. No. 4,761,663, which is incorporated herein by reference.

Figure 10:
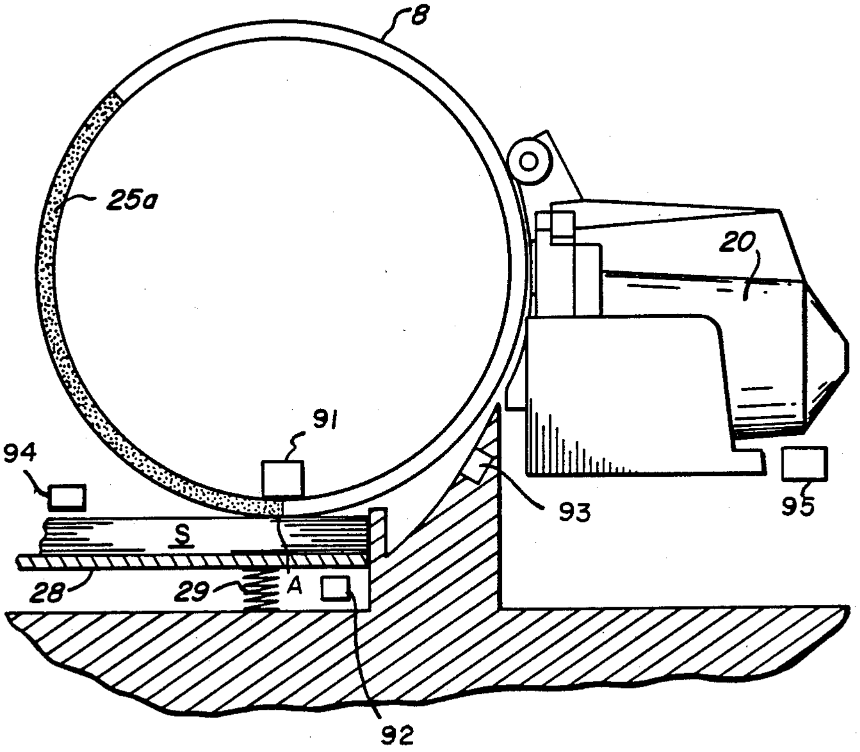
FIG. 10 is a schematic side view showing exemplary detectors for sensing printer conditions in accord with the present invention.

In accord with the present invention, the printer/-feeder embodiment shown in FIG. 10 has a detection/-control system comprising cooperative detectors for establishing proper initialization. Thus, detector 91 is constructed and located to sense and signal when the leading edge of frictional surface 25*a* is indexed at the contact zone A (i.e. zeroed), i.e. when the platen drum is at its home position. As shown, the detector 91 can be a pressure sensitive switch mounted opposite the contact zone on the platen roller interior and responsive to a protrusion on the platen interior surface that identifies the leading edge of surface 25*a.* One skilled in the art will appreciate that various other detectors such as optical shaft encoders, optical emitter detector pairs, etc. could be readily utilized to signal that the lead edge of surface 25*a* is in the predetermined (zeroed) location, or in a non-zeroed location.

The detector 92 shown in FIG. 10 is a leaf spring switch that is responsive to the downward movement of force plate 28 to signal whether the supported stack S is in the engaging or non-engaging condition vis-a-vis the platen 8. Again various other well known detector means can be utilized to provide a signal as to which condition the stack is in.

The detector 93 shown in FIG. 10 is a sheet detector comprising a light emitter located to direct a beam onto the sheet feed path and a light detector arranged to receive light reflected from such sheet and signal its presence. The drum surface adjacent the sheet detector is constructed to be sufficiently non-reflective to provide a good signal contrast between the presence of sheet and no-sheet conditions. Other sheet detector constructions will occur to those skilled in the art and in certain embodiments it is desirable to have a plurality of such detectors located at various positions on the sheet feed and transport path and coupled within an "Or" gate system to the printer control system logic.

The detector 94 shown in FIG. 10 is constructed and located to sense and signal the existence of paper at the supply station (i.e. on force plate 28). This detector can take the form of a light emitter sensor pair which distinguishes from a white sheet or dark force plate, or other forms known to those skilled in the art.

The printer also includes a detector 95 and related system (not shown) for controlling the position of carriage 10, e.g. to indicate it is in a proper start-of-traverse position. One preferred construction for accomplishing this and other functions comprises an optical gating and a light emitter-detector pair as described in U.S. Pat. No. 4,709,244; however, various other detector constructions can be utilized to sense and signal desired carriage position(s).

Figure 11:
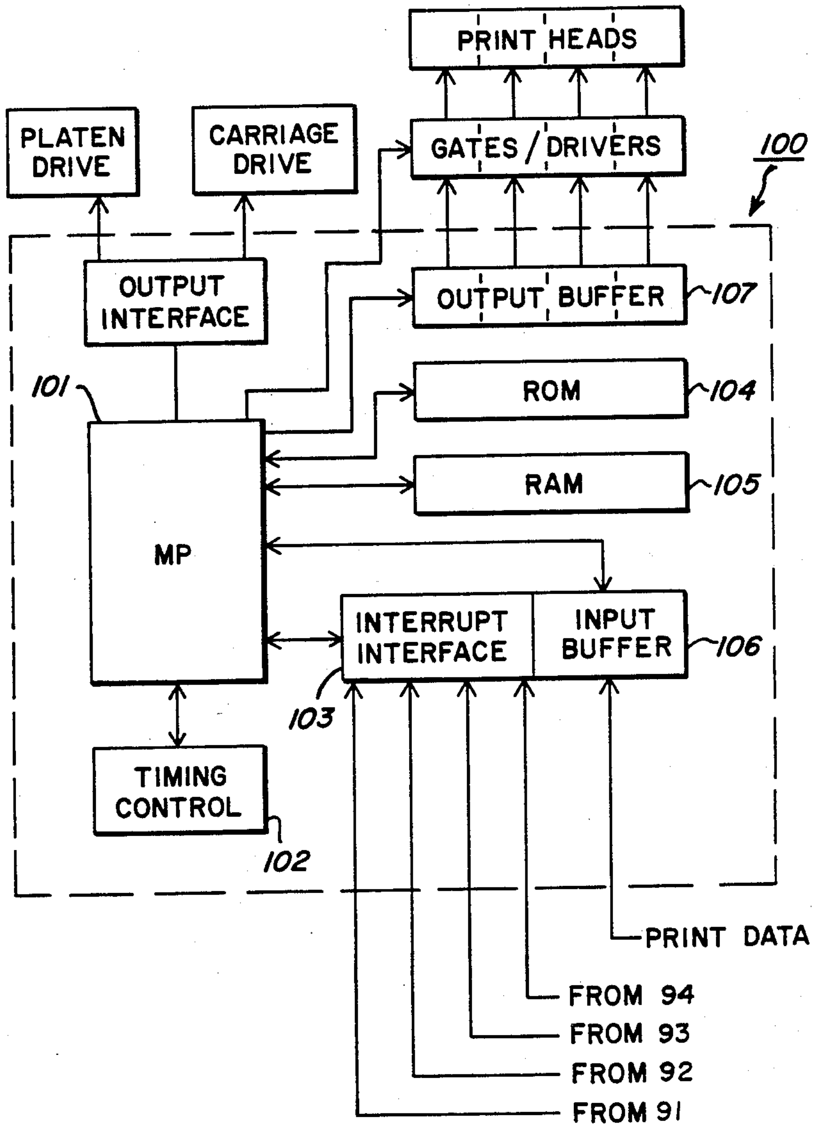
FIG. 11 is a block diagram of a printer control system incorporating the present invention.

The cooperative functioning of the above-described signalling means, in accord with the present invention, can be further understood by referring to FIGS. 11–16. As shown in FIG. 11, microcomputer control system 100 comprises a microprocessor 101 with related timing control and interrupt interface sections 102, 103 and cooperative read only memory (ROM) 104 and write/-read memory (RAM) 105. The system 100 also includes input and output buffer interface sections 106, 107 adapted to receive, store and output data for microprocessor 101. The ROM 104 contains programs whereby, on start-up, the microcomputer performs routines such as activating the printer motors, supplying energy for print/cartridge drivers, etc., as well as performing tests and adjustments for the attainment of proper start-up conditions. Included in such tests and adjustments are programs implementing the present invention, which analyze inputs from detector means 91, 92, 93 and 94 adjust the platen position and signal deficiencies or enable a printing cycle.

The printing carriage arrangement shown in FIG. 3 is constructed for high speed printing and described in more detail in U.S. Pat. No. 4,761,665, which is incorporated herein by reference. However, the present invention is equally useful with printer embodiments wherein a plurality of print heads each traverse the complete print zone as described in U.S. Pat. No. 4,761,664 and also incorporated herein by reference.

FIGS. 12–16 illustrate, by flow diagram, the functions performed in accord with the present invention for different print media modes, e.g. sheet feed or continuous form, and for the changeover between those modes. In those diagrams the states of decision significant ones of detectors 91, 92, 93 and 94 are represented within circles by the following convention:

First bit (Sensor 91):
1=drum at home station
0=drum not at home station
Second bit (Sensor 92):
1=force plate up (sheet media)
0=force plate down (tractor media)
Third bit (Sensor 93):
1=paper on print drum
0=paper not on print drum
Fourth bit (Sensor 94):
1=paper on force plate
0=paper not on force plate The situations whereby the state of a particular sensor is not significant to a decision is designated by the notation "x" in the sensor bit position at those decision stages.

Figure 12:
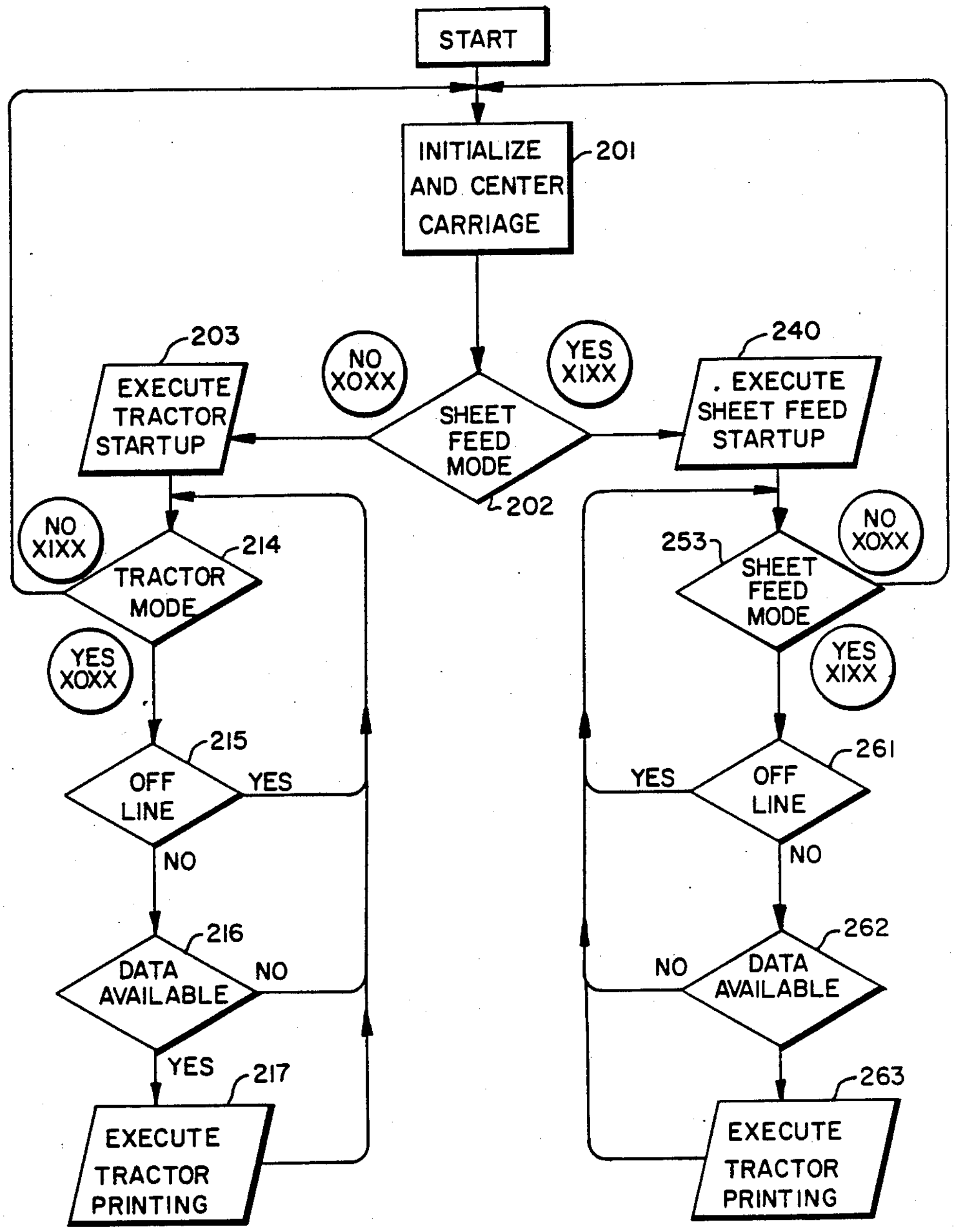

The master flow chart of FIG. 12 illustrates the printer operation from the time it is powered on by the operator. Subsequent flow charts are branches from this main block diagram schematic. After printer executes one of the branch routines, the printer control returns to the primary block diagram description shown in FIG. 12.

Referring to FIG. 12 and assuming that the printer has just been powered on, the first operation is to initialize the carriage and move it from the home position, located at the extreme left-hand side of the printer, to a center position in the middle of the drum (process 201). This is the "park" position for the carriage. The carriage returns to this "park" position each time a new sheet of paper is fed from the paper cassette or each time the form feed is executed in the tractor feed mode. After the carriage reaches the center position, the system checks the sheet feed mode sensor 92 to determine if the printer is set up for tractor or sheet feed operation (decision 202). Assuming first that the force plate is in the down position, away from the platen, the system is in the tractor feed mode. The next step shown in the block diagram in FIG. 12 is to execute the tractor stratup sequence (input/output 203) and this entire sequence is described in detail in FIG. 13.

Figure 13:
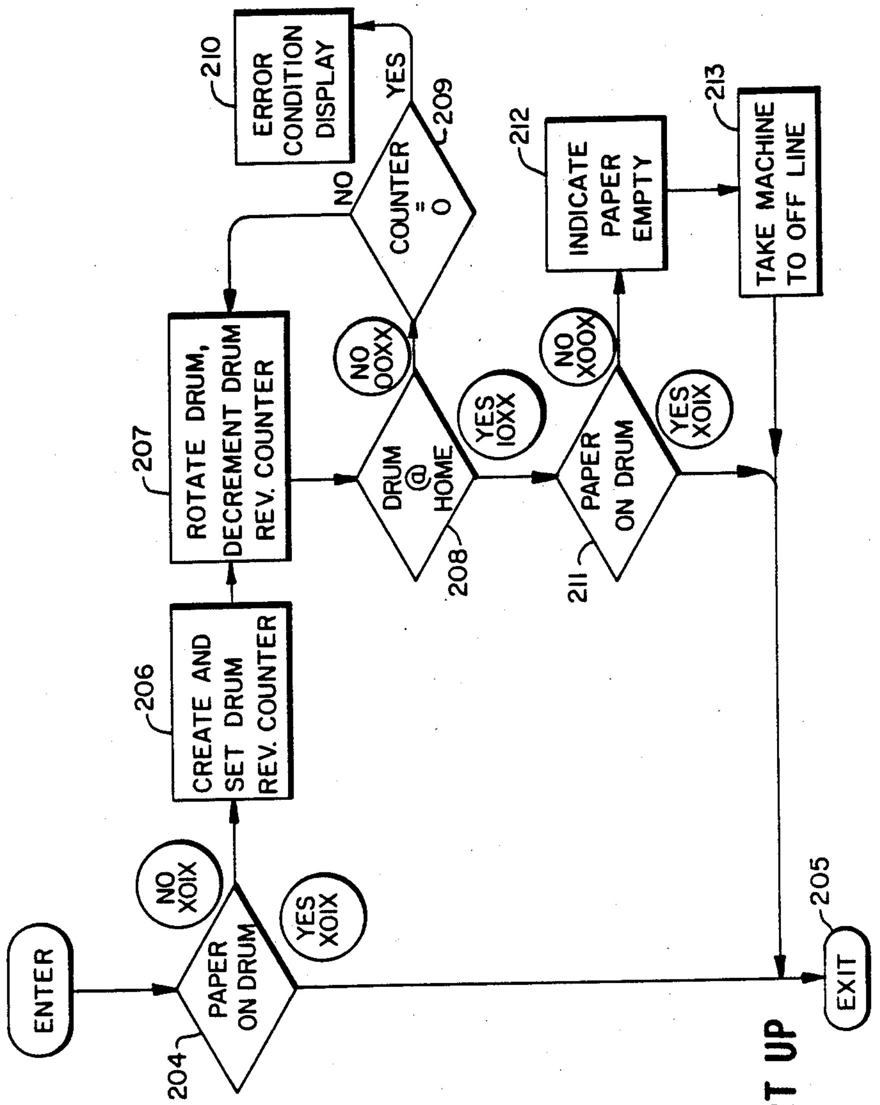

Thus, referring to FIG. 13, the control system first looks at the "paper on drum" sensor 93 to determine if paper is present on the platen (decision 204). If the answer is yes, the control system simply leaves the tractor feed start-up mode (exit 205) and returns to the main block diagram shown in FIG. 12. Operation continues in the tractor feed mode. Still with reference to FIG. 13, assume that no paper was present on the drum. The next steps are creating a counter and setting a count equal to one drum revolution (process 206) and then rotating the drum (process 207). Rotation continues until the drumm reaches the home position (decision 208), based on a signal from detector 91. At the home position, the leading edge of the rough surface of the platen is at the normal paper contact point for cassette fed paper. If the counter goes to zero (decision 209) and the drum has not reached its home position, an error condition has occurred and the machine will immediately go off-line and display this error to the operator (process 210). The operator must reset the machine at this time and determine why the platen will not rotate to its drum home position.

Assuming now that the drum has reached its home position, the next step in the sequence is to determine of paper has appeared on the platen (decision 211), which is possible if paper had been inserted into the inlet slot, but had not rotated around the platen far enough to be recorded by the "paper on drum" sensor. The action of rotating the drum to the home position can conceivably advance the paper in front of the "paper on drum" sensor. Once paper is on the drum, the machine control will exit (205) the tractor start-up sequence and return in the tractor mode to the main power-up schematic shown in FIG. 12.

Still referring to FIG. 13 and assuming that the drum reached the home position and no paper appeared on the drum, the printer will simply indicate that the paper is empty on the operator panel (process 212). The printer will go off-line (process 213) and then return from the tractor start-up sequence to the main schematic shown in FIG. 12. Once the printer has returned from the tractor start-up mode by any of the sequences just described, it continues to operate in the tractor mode by periodically monitoring the force plate position (decision 214). Provided the force plate remains down away from the platen, the system is assured that it is operating in tractor mode. If the machine is on-line, it will simply wait for data (decision 215); and when it receives data, it will execute the tractor printing subroutine (input/output 217). If at any time the paper empty sensor 94 indicates that paper is not available on the plate, the machine will go off-line (decision 215). When the machine is put back on-line by the operator who presses a button on the front panel, the system control returns to the tractor feed start-up mode.

In order to execute tractor printing, the machine must be in the tractor state in the on-line position with the paper on the platen and data must have been received from the host. This forces the machine control to the tractor printing sequence as described in detail in FIGS. 14-A and 14-B. The first step is to check a created sheet length counter (decision 219). If the count is zero, it is set to the number of steps per sheet (process 220). Essentially, this is the operation to define the "top of form" so that automatic perforation skip can be accommodated.

After the counter has been properly set, the machine control will allow printing of one line of data (process 221), and then look at the input data to determine if a line feed has been sent from the host or from the operator panel (decision 222). If the answer is no, the machine control will follow the Path A as shown in FIG. 14-B, which determines (decision 223) if the form feed command has been sent from the host computer or the operator panel. Assuming once again that the answer is no, the machine control exits the tractor printing mode and returns in the tractor feed mode to the main schematic shown in FIG. 12. It returns at the point just beyond the tractor start-up sequence execution (214).

Referring once again to FIG. 14-A, assume that after a line of data has been printed, a line feed command has been sent. The drum will step one line and decrement the number of steps per sheet count (process 224) to keep track of the form length. Next the machine will verify that paper is still present on the drum (decision 225) and if paper is present, machine control will follow Path C as shown in FIG. 14-B, exiting the tractor printing mode and returning to the main schematic shown in FIG. 12 at the location just below the execution of the tractor start-up (214).

Returning now to the tractor printing sequence of FIG. 14-A, assume that paper was not sensed on the platen after the line of printing was completed and the line feed command was executed. The next process followed by the machine control is to decrement a counter (process 226) that is created and used to determine the feeding sequence is at the last print position on the sheet. It should be noted that it is possible, due to a physical location of the paper empty sensor, to determine that paper is not on the platen at the sensor location, but that there are still available print lines on the sheet of paper. Thus, the counter is used to identify the actual paper position to allow printing on the bottom of the sheet and avoid printing on the platen. For example, if the counter has not reached zero (decision 227), the tractor feeding sequence then follows Path C which returns the machine to the tractor mode, FIG. 12.

Now looking at Path B as shown in FIG. 14-B of the tractor feeding sequences, and assuming that the counter has gone to zero (yes at decision 227) indicating that the last print position on the paper has just been covered by the last line of input data printed. The next steps in the sequence are to move the carriage to the center of the drum (228), to step the drum the remainder of steps required in the sheet count (229) and continue rotation (330) to eject the printed sheet beyond the bail arm rollers. After so rotating the drum, if paper appears on the drum (decision 231), the system will simply exit the tractor printing sequence and return to the main schematic shown in FIG. 12 at the location just beyond the tractor start-up sequence (214). Assuming that no paper appears at the paper on drum sensor location (231), the machine control sets up a counter (232) and rotates the platen (233) to the zero position (234). If it cannot reach the zero position in one full drum revolution (235), the machine goes off-line and an error condition (236) is displayed on the operator panel. Assuming that the drum can reach the zero position, its rotation will stop at the home position (234). The operator panel will then indicate a paper empty state (237), the machine will be taken off-line (238) and a machine control will now exit the tractor printing mode (239) and return to the tractor operation branch (214) of the main schematic shown in FIG. 12.

It should be noted that each time the machine control returns to the tractor mode after having executed a tractor printing sequence, it evaluates the sensor output to determine that the machine is still in the tractor mode, i.e. that the force plate is still in the down position. It then continues through the tractor mode until it receives data, then once again executes the tractor printing sequence just described.

Now considering the sheet feed start-up, i.e. assume that after power up, the machine control interprets (202) the sensor output to identify the sheet feed mode (202) as shown in FIG. 12. The first step executed by the machine control is to perform the sheet feed start-up sequence (subroutine 240), described in detail in FIG. 15. Referring to that Figure, the first operation is to set a counter to number 2 (process 241). Next, another counter is created and set to the number of steps it takes to rotate the drum one full revolution (process 242). Then the drum begins to rotate (243) while looking for its home position (246). If the home position cannot be found (decision 244), the machine will signal an error condition (245) and display this condition on the operator panel. Provided that the drum reaches the home position (decision 246) before it has made one full revolution, it will then decrement the corrected process counter to be number 1 (process 247). The reason for this corrective process counter will be apparent in the subsequent description. If this counter becomes less than zero (decision 248), we have reached the error condition (249) and this is displayed on the operator panel as the machine is taken off-line.

Figure 15:
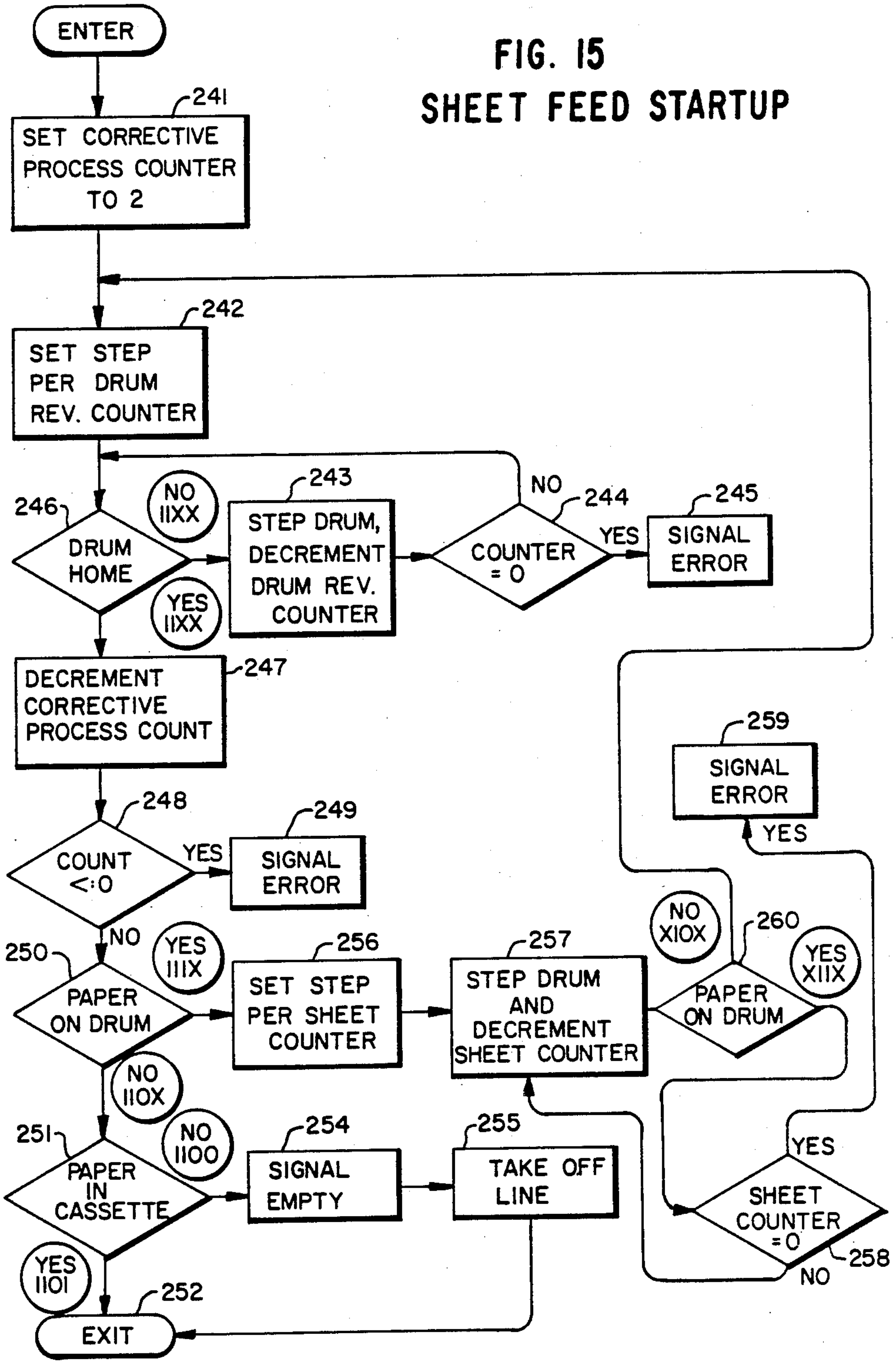

Still referring to FIG. 15, the machine control then looks at the paper sensor to determine if paper is on the drum (250). If no paper is on the drum, the machine will determine if paper is located in the cassette (decision 251). Provided that there is no paper on the drum and paper is in the cassette, machine control will exit the sheet feed start-up sequence (252) and return to the main schematic shown in FIG. 12 just below the location of the execution of the start-up sequence (253). If paper is not on the platen and paper is not available in the paper cassette, the machine control will indicate that the paper is empty on the operator panel (254) and take the machine off-line (255), then exit sheet feed start-up sequence (252) and return to the sheet feed mode on the main flow chart (253), FIG. 12.

Let us now assume that paper is on the drum after the drum has been brought to its home position and the corrective process counter has been decrement to number 1. The next step followed by machine control is to create and set a counter (256) equal to the length of one sheet of paper. The drum will begin to rotate (257) in an attempt to remove the paper from the platen and the sheet counter will decrement. After the drum has rotated the length of a full sheet of paper (decision 258) if paper is still sensed on the drum, an error condition will be present and this condition will be displayed on the operator panel as the machine is taken off-line (process 259). Provided the paper is removed from the platen sometime during the sheet feed length (decision 260), the system will now take the drum to the home position and decrement the corrective process counter to zero. Next machine control will determine if paper is on the platen once again (250). If paper is still on the platen, the process (250 to 260) will repeat itself and the next time through the loop the value of the corrective process counter will be less than zero indicating an error condition (249).

It should be noted that this portion of the schematic is particularly useful with a platen of four revolutions per sheet feed length where the bail arm rollers are located relatively close to the paper bucklers. In such an embodiment, it is always possible to synchronize the platen with the cassette paper over the period of one sheet of paper, which is the primary reason for the corrective process counter. That is, if the machine is powered on with paper on the platen, that sheet will be ejected and if the drum is not synchronized, it will eject one additional sheet. This will force the drum to be synchronized with the cassette paper. If the conditions cannot be satisfied such that the drum is at the zero position and no paper is on the platen in the sheet feed mode, the system will identify an error condition on the operator panel. Another general point should be mentioned. Referring back to the tractor feed start-up, it will be appreciated that each time the printer is out of paper in the tractor feed mode, the platen will automatically zero itself to the start-up sheet feed position. This helps to assure that the drum is synchronized with the paper in the cassette when the operator converts the printer from the tractor feed to the sheet feed mode. It is always necessary to drop the force plate to load paper into the cassette for sheet feed operation. This lowering of the force plate is interpreted by machine control to be a conversion to the tractor feed mode. The drum synchronizes itself in the tractor feed mode before returning to sheet feed operation.

Referring once again to FIG. 12, assume that the printer has successfully completed the sheet feed start-up sequence (240). Next the machine control verifies that the printer is still in the sheet feed mode (253) by evaluating the position of the force plate. If the force plate is moved to the tractor feed mode, the printer is immediately taken off-line (decision 261). The same circumstance happens when converting from tractor feed to sheet feed mode. In other words, any time the force plate is moved by the hand lever available to the operator, the machine is automatically taken off-line. This is a precaution to prevent the operator from changing the print media without acknowledging that fact.

Continuing the sheet feed sequence as shown in FIG. 12, when data is available for printing (262), the machine control will execute the sheet feed printing sequence (subroutine 263), which is described in detail in FIGS. 16-A and 16-B. As the printer enters the sheet printing mode, the first operation is to check the number of steps per sheet count (264). If this count does not equal zero, one line of data will be printed (process 265). Provided no line feeds (decision 266) or form feeds (decision 267) are requested from the data stream or from the operator panel, the system will exit (268) the sheet printing mode and return to the sheet feed mode master sequence shown in FIG. 12. If the number of steps per sheet count was equal to zero (264), the machine control interprets this to mean the start of a new sheet feed sequence and the drum should be at the home position (269) because the sheet feed start-up sequence has already been executed and that sequence forced the drum to the home position. If the sheet printing mode is entered with the steps per sheet counter equal to zero and the drum not at the home position, an error condition (270) is signalled and the machine is taken off-line.

Assume that the drum is at the home position. The machine control will determine if paper is in the cassette (271) via sensor 94. If paper is not present in the cassette, the machine will indicate that paper is empty (272)

on the operator panel and take the machine off-line (273) then return to the primary sheet feed mode sequence (253) described in FIG. 12. Looking now at the other possibility shown in FIG. 16-A, assume that the drum is in the zero position (269), paper is present in the cassette (271) and that the steps per sheet count is equal to zero (264). The machine control will force the carriage to move to the center of the drum (274), it will then create and set a counter (275) and begin to rotate the drum (276) the required number of steps to load a sheet of paper to the first available print position (277). If paper is not present on the drum after a predetermined number of steps (decision 278), an error condition will be displayed on the operator panel and the machine will be taken off-line (process 279). Assuming paper is located on the drum, the number of steps to load the sheet counter is again evaluated (280) to determine if the paper appeared too early at the platen sensor. This also signals an error condition (process 281) resulting from the fact that the paper was partially out of the cassette at the time the feeding sequence started. The condition is displayed on the operator panel and the machine is taken off-line.

When the sheet is loaded properly within the window of minimum/maximum number of drum counts (decision 282), the next step is to set up a counter (283) that will determine when the last print line should be seen by the paper on drum sensor. This counter is used to evaluate feeding errors during the printing operation. Following Path A in the sheet printing mode, the next step in the printing sequence is to print the line of data (265) and evaluate (266) whether or not a line feed has been received. If a line feed has been received, the drum will advance the number of steps required and decrease the sheet count by that line feed length (process 284). Next, the machine control will determine (285) if paper is on the drum. If paper is not on the drum and the number of steps per sheet count has gone to zero (286), this indicates that the last line of the sheet has been printed and the machine exits the sheet printing mode (268) and returns to the master sheet feed sequencing (253) shown in FIG. 12.

Assume in FIG. 16-B that paper is still present on the drum (285). It is necessary that the sheet feed count be greater than some minimum number. This is due to the relative positioning of the paper on drum sensor and the print heads. There are approximately four additional print lines on the paper after the paper on drum sensor indicates that paper has advanced beyond the sensor location. So further assume that the paper is still present on the drum and that the sheet length counter has decreased to some number below a minimum threshold which has been predetermined (decision 287). This is clearly an error condition that has resulted from slippage between the platen and the paper as the paper was fed through the printer. The error condition is displayed on the operator panel and the machine is taken off-line (process 288).

Following the other possible scenario shown in FIG. 16-B, assume that paper is present at the sensor location (285) and that the counter (286) indicates that we still have some number of available print lines greater than the predetermined minimum. Then by definition, the number of steps per sheet count will not equal zero, therefore, we can exit the sheet printing mode (268) and return to the master sheet feeding sequence (253) described in FIG. 12.

Return once again to the condition just after the line feed has been performed and the sheet step count (284) has been decremented as shown in FIG. 16-B. Assume that paper is no longer present on the drum (decision 285) and that the number of steps per sheet count is equal to zero (decision 286). This indicates that the last available line on the sheet of paper now loaded on the platen has just been printed. Next the machine control sets up a counter (289) equal to one drum revolution and begins to step the drum (290) while looking for the drum home position (decision 291). If the home position is found, the machine control will exit (268) the sheet printing sequence and return to the master sheet feed mode sequencing (253) shown in FIG. 12. If the drum rotates one full revolution and does not find its home position (decision 292), an error condition is identified, it is displayed on the operator panel and the machine is taken off-line (process 293).

Return now once again to Path A of the sheet feed printing sequence and assume that after printing one line of data (265) a line feed was not received (266), but rather a form feed command was received by the machine control at the (decision 267) point. The printer will begin stepping the drum for the remainder of steps necessary to satisfy the sheet feed count (294). Next, the printer will determine if paper is present on the drum (295). Since the platen advanced the length of the sheet remaining in the sheet feed count, no paper should be present at the sensor. If paper is identified, an error condition has been reached. This condition will be displayed on the operator panel and the printer will be taken off-line (process 296). If the paper on drum sensor indicates that the trailing edge of the paper has left the sensor at the proper drum rotation increment, then another counter (289) is set up to rotate the drum for one revolution. During this drum rotation (290) the machine control looks for the drum home position (291). If the drum home position cannot be located (291) with one full drum revolution (292), an error condition is displayed on the operator panel and the machine is once again taken off-line (process 293). If the drum home position is found (291) and paper is not present on the platen at the paper sensor, the machine completes its form feed operation and exits (268) the sheet printing mode and returns to the master sheet feed sequence (253) shown in FIG. 12. Note that even though the form feed button was pressed, a new sheet of paper is not loaded onto the platen at the first available print position until data is received from the host computer. In this way, if the operator wishes to discontinue printing operation or to convert the sheet feed printer into the tractor feed mode, the operations can be done immediately without concern for sheet feed paper on the platen. The printed sheet is ejected when the drum rotates to its zero position.

The cooperation of the four sensors just described cover most conceivable situations that can result from a paper handling system as versatile as the one described. Most of the functions and error detections are automatic and require little operator intervention. The sensors cooperate to make the system user friendly and intuitive so that there will be no difficulty interpreting the sheet feed commands. All of the error conditions can be clearly described on the liquid crystal display built into the operator panel. The top of form is assumed to be at the first available print line in the sheet feed mode and it is assumed to be at the current drum position at power up in the tractor feed mode. Features such as described above provide significant advantages for sheet feeders according to the present invention, e.g. in comparison to existing add-on sheet feeders that behave essentially like continuous form feed mechanisms in terms of automatic control and operator interface.

The invention has been described in detail with particular reference to preferred embodiments thereof, but it will be understood that variations and modifications can be effected within the spirit and scope of the invention.

We claim:

1. In a compact printer having a housing, a cut-sheet supply station formed in a first portion of said housing and a rotatable print platen constructed and located to feed top sheets from said supply station, through a print path ingress and past a print zone and a print path egress formed in a second portion of said housing, a print media handling system comprising:

(a) means mounting said supply station for movement to and from a sheet engaging relation with respect to said print platen;

(b) means forming an inlet passage from a location spaced from said supply station to said print path ingress;

(c) actuator means for selectively effecting the movement of said supply station and for selectively blocking said inlet passage;

(d) first program control means for effecting a predetermined start-print sequence for sheet print media;

(e) second program control means for effecting a predetermined start-print sequence for continuous print media; and (f) means for detecting the condition of said actuator means and selecting said first or second program control means in response thereto.

2. The invention defined in claim 1 wherein said first program control means includes a first counter means for controlling predetermined advance of said platen for sheet feed printing and second counter means for controlling a different predetermined advance of said platen for continuous media printing.

3. The invention defined in claim 1 further including means for detecting, during both continuous and sheet start-up modes, when and when not print media is located at a predetermined position on said print path, and wherein : (i) during start-up, said second program control means continues the print routine in response to detection of media at said predetermined position and (ii) during start-up said first program control means performs a sheet eject routine in response to detection of media at said predetermined position.

4. The invention defined in claim 1 further including means for controlling rotation of said platen to a predetermined feed-start orientation and counter means for effecting rotational increments of said platen to position print media at a predetermined print-start position, whereby print media position is referenced directly to said platen.

5. The invention defined in claim 1 wherein said first program control means includes means for detecting the availability of line print data and means for effecting sheet feed onto said print platen only when print data is available.

6. The invention defined in claim 1 further comprising:

(g) means for detecting a predetermined orientation of said platen;

(h) means for detecting the presence or absence of print media on said platen; and (i) means for detecting the presence or absence of sheet media at said supply station.

7. The invention defined in claim 6 further comprising a print head carriage, including a sheet guide, that is movable to traverse said print zone and means for controlling and detecting movement of sheet guide to a central position along said print zone.

* * * * *